United States Patent [19]

Flotow et al.

[11] Patent Number: 5,058,719
[45] Date of Patent: Oct. 22, 1991

[54] DRIVE ASSEMBLY FOR CLUTCH PLATE

[75] Inventors: Richard A. Flotow, Butler; Martin E. Kummer, Auburn, both of Ind.

[73] Assignee: Dana Corporation, Toledo, Ohio

[21] Appl. No.: 675,608

[22] Filed: Mar. 25, 1991

[51] Int. Cl.[5] .................... F16D 13/70; F16D 3/06
[52] U.S. Cl. ................ 192/70.19; 192/70.16; 403/356
[58] Field of Search .......... 192/70.19, 70.2, 70.16; 16/37, 38; 403/163, 161, 356

[56] References Cited

U.S. PATENT DOCUMENTS

| | | |
|---|---|---|
| 1,998,613 | 4/1935 | Ford . |
| 2,257,877 | 10/1941 | Binder . |
| 2,848,732 | 8/1958 | Huff ........................................ 16/38 |
| 2,905,490 | 9/1959 | Trandel . |
| 3,048,248 | 8/1962 | Becknell . |
| 3,317,013 | 5/1965 | Smirl . |
| 3,424,288 | 1/1969 | Sink ................................... 192/70.16 |
| 4,120,071 | 10/1978 | Crescenzi ................................ 16/37 |
| 4,333,554 | 6/1982 | Sink et al. ......................... 192/70.19 |
| 4,479,569 | 10/1984 | Kummer et al. ............. 192/70.19 X |
| 4,579,473 | 4/1986 | Brugger .............................. 403/163 |

FOREIGN PATENT DOCUMENTS 1485591  9/1977  United Kingdom .................... 16/37

*Primary Examiner*—Rodney H. Bonck
*Attorney, Agent, or Firm*—F. B. McDonald

[57] ABSTRACT

A drive assembly is adapted for engagement with a driven clutch plate of a heavy-duty truck. The drive assembly incorporates a drive pin comprising a shank inserted into a flywheel, and a spindle which extends radially inwardly from the flywheel. A drive head is rotatably mounted on the spindle, which incorporates a groove containing a compressible friction ring for assuring frictional retention of the head. The drive pin includes a shoulder situated intermediate shank and spindle, the shoulder incorporating a frustoconical portion to provide a tapered bearing surface for rotatably supporting the drive head on the spindle. The shoulder also contains a radially extending annulus which faces the shank, the annulus adapted for limiting depth of insertion of the shank into the flywheel. In the same preferred form, the drive head has a tapered counterbore to matingly engage the frustoconical portion, and also contains a plurality of chamfered surfaces adjacent opposed ends of the head. The chamfered surfaces facilitate engagement of the head into a drive slot of a driven plate during clutch assembly.

12 Claims, 2 Drawing Sheets

DRIVE ASSEMBLY FOR CLUTCH PLATE

BACKGROUND OF INVENTION

This invention relates to clutch drive mechanisms adapted to engage axially moveable, driven clutch plates in motor vehicles. More particularly, the invention relates to heavy-duty clutches of the type having a flywheel drivingly coupled to an intermediate driven plate for transmission of torque to the plate.

Prior art drive mechanisms for intermediate clutch plates have endured limited success in accommodating misalignments between plate and flywheel members. Most incorporate drive heads of various configurations which extend radially inwardly from the flywheel for rigid engagement with a drive slot of the intermediate plate. One newer design, however, permits a drive head to swivel or rotate on a drive pin which extends from the flywheel for registration of the head with the intermediate plate slot. Although the latter offers greater accommodation for misalignment than do the "fixed" head designs, there remains room for improvement with respect to both installation and operating performance.

For example, the drive pin lacks a positive mechanical stop upon its being press-fitted into a receiving bore in the clutch flywheel, thus requiring special precautions against over-insertion. Moreover, upon mounting the drive head on the pin, there is no provision for assuring clearance between the drive head and the internal surface of the flywheel. Such clearance avoids contact between drive head and flywheel members, and thus is necessary to assure interference-free swivel of the drive head.

Finally, the actual shape of the drive head does not lend itself to ease of installation of the intermediate plate. Thus, there remains a need to redesign the head to more readily engage an intermediate plate drive slot.

SUMMARY OF THE INVENTION

The clutch plate drive assembly as disclosed herein provides an improved self-aligning drive head for imparting a coupling torque to a clutch plate from a flywheel. The apparatus incorporates a positive stop for controlling depth of insertion of the shank of a drive pin into a flywheel bore, and also provides a mechanism to assure clearance between drive head and flywheel members. In addition, the shape of the drive head facilitates engagement of the head into a drive slot of the driven clutch plate during assembly.

In a preferred form, the drive assembly is adapted to engage an intermediate clutch plate of a heavy-duty truck. A drive pin extending from a clutch flywheel includes a shoulder positioned between respective shank and spindle ends of the pin. The shank is adapted for being fixedly received in a flywheel bore, while the spindle is adapted for rotatably receiving a drive head. The shoulder includes a frustoconical portion which converges in a direction toward the spindle, the shoulder also defining a radially extending annulus which axially faces the shank. The annulus is adapted for limiting depth of insertion of the shank into the flywheel, while the frustoconical portion of the shoulder provides a tapered bearing surface for rotatably supporting the drive head on the spindle. The drive head defines a mating tapered counterbore adapted to seat against the frustoconical shoulder portion.

Finally, in the preferred embodiment, the shoulder includes an integral spacer portion which defines a disc-shaped base of the shoulder, and contains the annulus which faces the shank. As such, the spacer assures clearance between the rotatable drive head and the internal diameter surface of the flywheel into which the shank of the pin is anchored.

DETAILED DESCRIPTION OF THE PREFERRED EMBODIMENT

Figure 1:
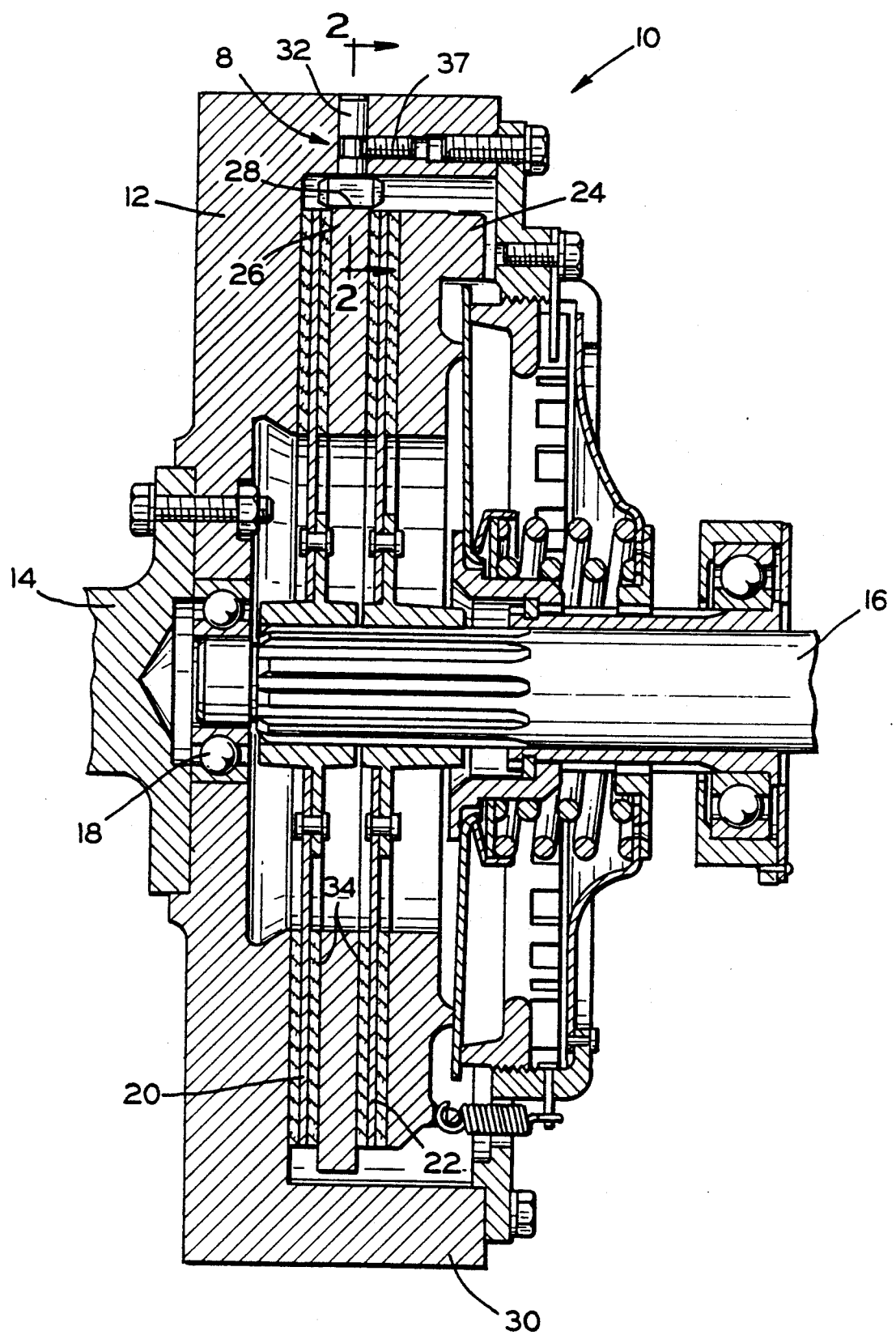
FIG. 1 is a cross-section of a heavy-duty two-plate clutch which incorporates the subject drive assembly of the present invention.

Referring initially to Figure a heavy-duty two-plate vehicular clutch 10 incorporates a preferred embodiment of the subject drive assembly 8. The clutch 10 includes a flywheel 12 coupled for unitary rotation with a power shaft 14, shown fragmentarily, which extends from an engine, not shown. Per conventional practice, an output shaft 16, also shown fragmentarily, is piloted at its forward end in the flywheel 12 by bearings 18. A pair of friction discs 20 and 22 are splined to the forward end of the output shaft 16 for unitary rotation with and relative axial movement on the shaft 16. An axially moveable spring loaded pressure plate 24 is disposed for urging the discs 20 and 22 into driving engagement with the flywheel 12. A clutch intermediate plate 26 is sandwiched between the discs 20 and 22, the outer periphery of the intermediate plate containing recesses or drive slots 28 (see FIG. 2) for being coupled with and for rotatable engagement with the flywheel 12.

Figure 2:
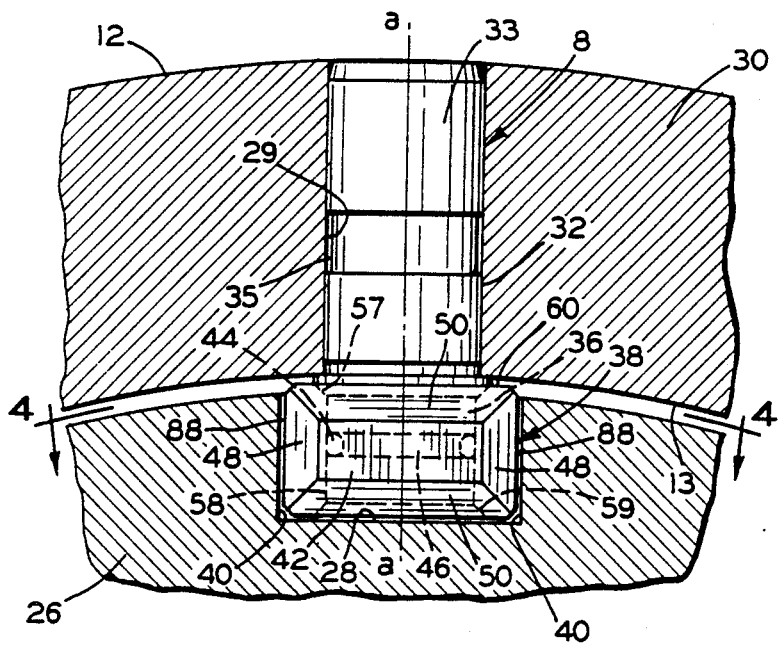
FIG. 2 is a fragmentary cross-section, taken along lines 2—2 of FIG. 1, which shows the drive assembly of the present invention in detail.

The flywheel contains an axially extending annular flange 30 which radially encompasses the driven discs 20 and 22, as well as the pressure and intermediate plates 24 and 26, the latter two plates functioning as drive members. Referring now also to FIG. 2, a plurality of drive assemblies 8 (only one of which is shown) extend radially inwardly from the flange 30 for registration with the slots 28 (only one shown) in the intermediate plate 26. The intermediate plate is thereby at all times drivingly coupled to the flywheel 12 notwithstanding axial floating of the plate during clutch operation. By means of conventional friction facings 34 on the discs 20 and 22, those skilled in the art will appreciate that each disc engages one side of the intermediate plate, and that the plate is thus designed to carry a portion of the transmitted torque which the pressure plate would otherwise have to carry.

Referring now specifically to FIG. 2, each drive assembly 8 includes a drive pin 32, and a drive head 38 frictionally but rotatably mounted to the pin. Each pin 32 includes a shank 33 at one end adapted for insertion into a bore 29 of the annular flange 30 of the flywheel 12. A groove 35 is disposed circumferentially about the shank 33 to receive a set screw 37 (FIG. 1) for securement of the pin 32 within the bore 29.

At the opposite or second end of the pin 32 is a spindle 36 adapted for receiving the drive head 38 (FIGS. 2 and 4). The spindle 36 also contains a circumferential groove 46, referred to as a friction groove, adapted to contain a friction ring (FIG. 2), preferably of silicone or other compressible material, for assuring frictional retention of the drive head 38 to the spindle 36 under temperatures approaching 500 degrees Fahrenheit. Such retention is desirable even beyond assembly, because during use the head will be subjected to continuous oscillatory movements on the fixed spindle.

Figure 3:
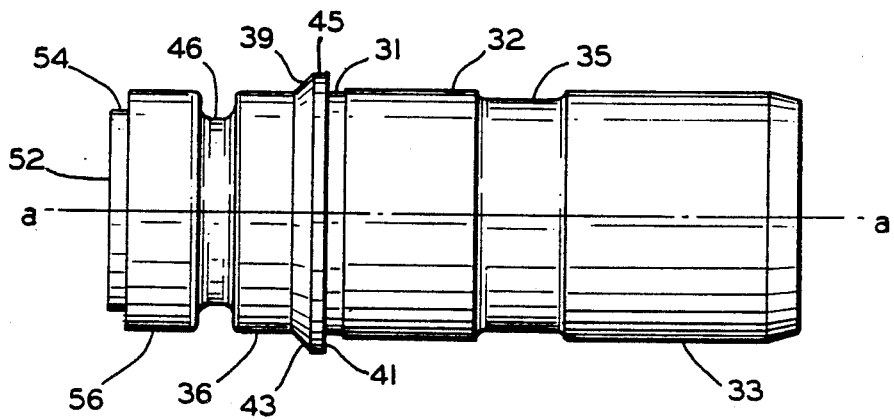
FIG. 3 is a side elevation of the drive pin employed in the same preferred embodiment of the drive assembly.

Referring to FIG. 3, positioned between the shank 33 and the spindle 36 is a circumferential shoulder 39, which extends symmetrically about the axis a—a of the drive pin 32. The shoulder 39 is preferably an integral part of the pin, and defines a frustoconical portion 43 which converges in a direction toward the spindle 36. In the preferred embodiment, the angle of convergence in any given plane passing through axis "a—a" would be approximately 45 degrees as measured with respect to that axis. A preferred range of the angle of convergence would be 30 to 60 degrees.

Figure 4:
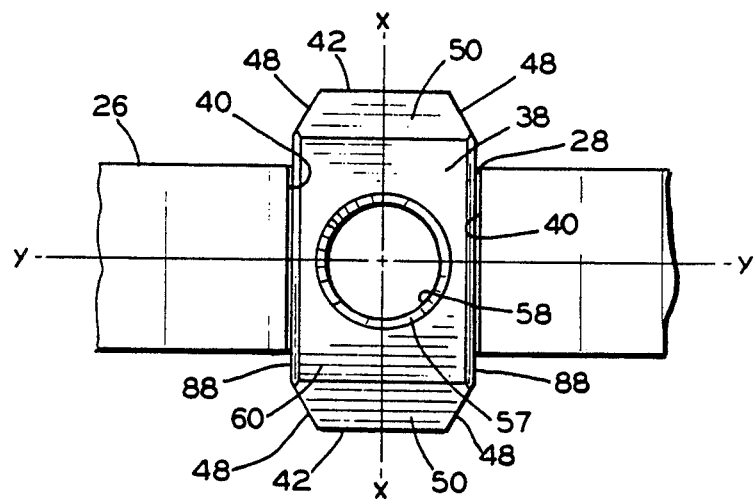
FIG. 4 is a fragmentary face view of a drive head of the assembly, taken along lines 4—4 of FIG. 2, shown in registration with a drive slot of an intermediate clutch plate.

Referring now to FIGS. 2 and 4, the drive head 38 contains an aperture 58 for receiving the spindle 36. At opposite ends of the aperture 58 are identically sized and tapered counterbores 57 and 59, each adapted to matingly engage the frustoconical portion 43. Thus the head 38 may be conveniently installed either end first onto the spindle. When engaged, each associated counterbore 57, 59 and portion 43 will act as bearings to support rotation of the head 38 on the pin 32. Those skilled in the art will also appreciate that the portion 43 of the shoulder 39 will also act as a stop to limit axial movement of the head 38 upon its installation onto the spindle 36. The invention contemplates use of a plurality of drive assemblies in the preferred embodiment, wherein the surface areas and the angles of convergence of the counterbores and frustoconical portions, respectively, are all equal.

At the widest end of the shoulder 39 is a radially extending annulus 41 which faces the shank 33. Upon insertion of the shank 33 into a bore 29, the annulus 41 is adapted to engage the internal diameter surface 13 (FIG. 2) of the flywheel flange 30, thus limiting depth of insertion of the pin 32 into the flywheel member.

In the preferred form, the shoulder 39 also incorporates a disc or ring-shaped spacer portion 45, which abuts the base of the frustoconical portion 43. The spacer portion 45, at its opposite end, defines the radial lip or annulus 41, and is thus designed to assure a prespecified minimum clearance between the top surface 60 (FIG. 2) of the drive head 38 and the internal diameter 13 of the flywheel flange 30. The clearance assures that the head will be free to swivel about the shank without interference with the flywheel.

EXAMPLE

In reference to FIG. 3, for a pin 32 having an axial length of approximately 1.25 inches, the length of the shoulder 39, including both the frustoconical and spacer portions, 43 and 45, will preferably fall within a range of 60–90 thousandths of an inch. The spacer length will range from 20–30 thousandths, or approximately one-third the overall axial shoulder length. The converging tapered surface of the frustoconical portion 43, as measured along its actual angle of convergence, will be approximately 60 thousands of an inch in length.

Continuing reference to FIG. 3, an impact boss 52 defines the axial extremity of the spindle 36. The boss 52 provides a medium by which the pin 32 may be inserted to its full depth via striking thereof (preferably with a brass hammer). The boss 52 has a diameter 54 equal to less than the greatest diameter 56 of the spindle 36, whereby upon impact of the boss by striking during insertion of the shank 33, the boss may become axially reduced in length as the metal thereof radially enlarges or spreads. The diameter 54 of the boss, however, is designed to never become as large as the greatest spindle diameter 56. This feature will assure that the maximum diameter of the spindle 36 will not be so great after insertion of the pin that the drive head 38 will not fit over the spindle. Obviously without the boss 52, there is a risk that the diameter 56 of the spindle 36 may become distorted and thus unable to accommodate subsequent mounting of the drive head 38.

Referring now back to FIGS. 2 and 4, each drive head 38 has a pair of sides 88 adapted to drivingly engage the walls 40 of each drive slot 28. As shown, each side 88 should be greater in length (see FIG. 4) than its associated wall 40, as the intermediate plate 26 is displaced (floats) along axis x—x during clutch operation. The head 38 is fixed along the same axis since it can only swivel about the pin 32 anchored into the flywheel.

Each drive head 38 incorporates a pair of opposed ends 42 adapted to facilitate entry of the head between the parallel walls 40 of an intermediate plate slot 28 during clutch assembly. Referring specifically to FIG. 4, the ends 42 are symmetrically spaced along axis y—y. During assembly, the intermediate plate is axially installed within the internal diameter surface 13 of the flange 30, and the drive heads 38 fit into the intermediate plate slots 28 which extend along the axis x—x. Typically, about six drive pins 32 and associated drive heads 38 each form part of a multiple clutch drive head assembly, the six assemblies being spaced symmetrically about the internal circumference of the flange 30. Although each drive head 38 is designed to swivel about its drive pin 32, it is often difficult to align the drive heads 38 with the slots 28 for expeditious engagement. The side chamfered surfaces 48, and top and bottom chamfered surfaces 50, all positioned adjacent the ends 42, facilitate insertion of the drive heads 38 into the slots 28 by enabling the drive heads 38 to more readily line up with the "x—x" axis of the slots 28 under relatively tight tolerances during clutch assembly. Typically, the clearances between the sides 88 of a drive head 38 and the associated slot walls 40 are on the order of a few thousandths of an inch. The use of chamfered surfaces facilitates alignment during assembly under such close tolerances, making it only necessary that the heads 38 be only roughly aligned prior to installation of the intermediate plate 26. Preferably, the angles of the chamfered surfaces are all approximately 30 degrees, as measured with respect to the axis "y—y" (FIG. 4) of the drive head 38.

Finally, an additional feature of the drive pin 32 is a reduced diameter section 31 immediately adjacent the radial lip 41 on the shoulder 39. The reduced section 31 permits some necking down of the shank 33 in cases of very tight tolerance with the bores 29 (FIG. 2). Under some conditions, without a reduced section 31, it will be relatively difficult if not impossible to fully insert the shank 33 to its full depth of insertion (the point at which the lip 41 engages the internal diameter surface 13).

Although only one preferred embodiment has been detailed and described herein, the following claims are envisioned to encompass numerous additional embodiments which fall within their spirit and scope.

What is claimed is:

1. In a clutch assembly including a flywheel having a radially extending bore, and a driven plate axially moveable but rotatably fixed with respect to said flywheel, said plate comprising an axially oriented drive slot, and a drive assembly for said driven plate including (a) a drive pin defining an elongate body having first and second opposed ends along an axis, said first end comprising a shank secured in said bore of said flywheel, said second end comprising a spindle extending radially inwardly of said flywheel, and (b) a drive head comprising an aperture receiving said spindle whereby said head is rotatably mounted on said spindle, and wherein said head is adapted to engage said slot of said driven plate; an improvement in said drive assembly wherein said drive pin further comprises a shoulder intermediate said shank and said spindle, said shoulder having a frustoconical portion which converges in a direction toward said spindle, said shoulder also having a radially extending annulus axially facing said shank, said annulus adapted for limiting depth of insertion of said shank into said flywheel bore.

2. The drive assembly of claim 1 wherein said shoulder extends circumferentially about said axis of said pin, and wherein said shoulder further comprises a spacer portion integral to said shoulder, said spacer portion defining a ring-shaped base portion of said shoulder.

3. The drive assembly of claim 2 wherein said spacer portion defines the axial boundary of said frustoconical portion and the radial boundary of said annulus, wherein said spacer portion is adapted to provide a pre-specified minimum clearance between said drive head and said flywheel.

4. The drive assembly of claim 3 wherein said drive head aperture includes a tapered counterbore comprising both a surface area and an angle of convergence equal to those of said frustoconical portion of said pin, said head further comprising a pair of opposed ends spaced along an axis, each end bounded by angled chamfered surfaces at the sides, top, and bottom of said drive head.

5. The drive assembly of claim 4 wherein said frustoconical portion has an angle of convergence range of 30 to 60 degrees, measured with respect to said axis of said elongate body of said drive pin.

6. The drive assembly of claim 5 wherein said chamfered surfaces all have equal angles, measured with respect to said axis of said opposed drive head ends.

7. The drive assembly of claim 6 wherein said spindle comprises an impact boss which defines an axial extremity of said spindle, said boss having a diameter equal to less than the greatest diameter of said spindle, whereby upon impact of said boss as by striking during insertion of said shank, said boss is adapted to become axially reduce in length while becoming radially enlarged, said diameter of said boss, however, always being less than said greatest spindle diameter.

8. The drive assembly of claim 7 wherein said drive pin further comprises a reduced diameter portion immediately adjacent said radially extending annulus of said shoulder.

9. The drive assembly of claim 4 wherein said spindle comprises a circumferential groove, wherein a compressible frictional ring is positioned within said groove, whereby said drive head is frictionally retained on said spindle.

10. The drive assembly of claim 9 wherein said compressible friction ring comprises a silicone material.

11. A clutch drive pin assembly comprising an elongate drive pin having first and second ends and a shoulder positioned intermediate said ends, a drive head rotatable on said first end said head having a pair of sides adapted to drivingly engage walls of a clutch plate drive slot, said second end of said pin adapted for insertion into a bore of a flywheel said shoulder comprising (a) first stop means for limiting depth of insertion of said second end into a flywheel, and (b) second stop means for limiting axial position of said head on said first end of said pin.

12. The drive pin assembly of claim 11 wherein said first stop means comprises a radially extending annulus facing said second end of said pin, and wherein said second stop means comprises a portion of said shoulder adapted to engage said drive head.

* * * * *